US 11,385,923 B2

(12) United States Patent
Sekman et al.

(10) Patent No.: US 11,385,923 B2
(45) Date of Patent: Jul. 12, 2022

(54) CONTAINER-BASED VIRTUALIZATION SYSTEM EXTENDING KERNEL FUNCTIONALITY USING KERNEL MODULES COMPILED BY A COMPILING CONTAINER AND LOADED BY AN APPLICATION CONTAINER

(71) Applicant: International Business Machines Corporation, Armonk, NY (US)

(72) Inventors: Tomasz Sekman, Cracow (PL); Artur M. Gruszecki, Cracow (PL); Tomasz Kazalski, Balice (PL); Andrzej Jan Wrobel, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 16/833,921

(22) Filed: Mar. 30, 2020

(65) Prior Publication Data

US 2021/0019169 A1 Jan. 21, 2021

(30) Foreign Application Priority Data

Jul. 16, 2019 (EP) .................................... 19186426

(51) Int. Cl.
*G06F 9/455* (2018.01)
*G06F 9/445* (2018.01)

(52) U.S. Cl.
CPC ...... *G06F 9/45558* (2013.01); *G06F 9/45516* (2013.01); *G06F 9/44521* (2013.01); *G06F 9/455* (2013.01)

(58) Field of Classification Search
CPC ............. G06F 9/45558; G06F 9/45516; G06F 9/44521; G06F 9/455
See application file for complete search history.

(56) References Cited

U.S. PATENT DOCUMENTS

| 5,911,068 | A | 6/1999 | Zimmerman | |
|---|---|---|---|---|
| 8,255,922 | B1* | 8/2012 | Fresko | G06F 9/544 |
| | | | | 709/215 |
| 8,533,707 | B2 | 9/2013 | Mukker | |
| 9,547,738 | B1* | 1/2017 | Denisenko | G06F 30/34 |
| 9,690,278 | B1* | 6/2017 | Chen | H03K 19/1776 |

(Continued)

FOREIGN PATENT DOCUMENTS

| CN | 106293756 A | 1/2017 |
|---|---|---|
| CN | 106569842 A | 4/2017 |

(Continued)

OTHER PUBLICATIONS

Examination Report dated Feb. 16, 2022 from corresponding GB Application No. GB2200996.3.
International Search Report dated Jul. 7, 2020 from corresponding PCT Application No. PCT/IB2020/056362.

(Continued)

*Primary Examiner* — Michael W Ayers
(74) *Attorney, Agent, or Firm* — Mark Bergner (57) ABSTRACT

The present disclosure relates to a method for extending kernel functionality of a kernel of a container-based virtualization system. The method comprises: providing in the container-based virtualization system a compiling container for compiling kernel modules against the kernel of the container-based virtualization system, and an application container for extending kernel functionality of the kernel using a kernel module. The application container may input the kernel module to the compiling container. The compiling container may compile the kernel module in the compiling container. The application container may receive from the compiling container the compiled kernel module. The application container may load the compiled kernel module to the kernel of the system for enabling the extension of the kernel functionality.

20 Claims, 4 Drawing Sheets

(56) References Cited

U.S. PATENT DOCUMENTS

| | | | | |
|---|---|---|---|---|
| 11,150,926 | B2* | 10/2021 | Polig | G06F 9/4552 |
| 2009/0089535 | A1* | 4/2009 | Lohmar | H04L 1/0084 |
| | | | | 714/751 |
| 2015/0339154 | A1 | 11/2015 | Wen | |
| 2015/0378752 | A1* | 12/2015 | Stoodley | G06F 9/44578 |
| | | | | 717/166 |
| 2017/0090897 | A1 | 3/2017 | Veereshwara | |
| 2018/0196732 | A1* | 7/2018 | Dolev | G06F 9/45558 |
| 2020/0065124 | A1* | 2/2020 | Chen | G06F 9/45558 |
| 2020/0225968 | A1* | 7/2020 | Ferraro | G06F 9/455 |
| 2020/0394049 | A1* | 12/2020 | Eder | G06F 9/45558 |

FOREIGN PATENT DOCUMENTS

| | | |
|---|---|---|
| CN | 107391141 A | 11/2017 |
| CN | 107423108 A | 12/2017 |
| CN | 108052327 A | 5/2018 |
| WO | 2021009612 A1 | 1/2021 |

OTHER PUBLICATIONS

Written Opinion dated Jul. 7, 2020 from corresponding PCT Application No. PCT/IB2020/056362.

Giles, "Container-Based Virtualization for Byte-Addressable NVM," 2016 IEEE International Conference on Big Data (Big Data), Dec. 5-8, 2016, 2 pages. <http://nvmw.ucsd.edu/nvmw2018-program/unzip/current/nvmw2018-final87.pdf>.

Sekman et al., "Method for a Container-Based Virtualization System," European Patent Application No. EP19186426.3, filed Jul. 16, 2019.

* cited by examiner

CONTAINER-BASED VIRTUALIZATION SYSTEM EXTENDING KERNEL FUNCTIONALITY USING KERNEL MODULES COMPILED BY A COMPILING CONTAINER AND LOADED BY AN APPLICATION CONTAINER

BACKGROUND

The present invention relates to the field of digital computer systems, and more specifically, to a method for extending kernel functionality of a kernel of a container-based virtualization system.

A container manager such as Docker is a set of coupled software-as-a-service and platform-as-a-service products that use operating-system-level virtualization to develop and deliver software in packages called containers. However, the portability of the containers may be limited due to their dependence on the system where they are deployed.

SUMMARY

Various embodiments provide a method for extending kernel functionality of a kernel of a container-based virtualization system, computer system and computer program product as described by the subject matter of the independent claims. Advantageous embodiments are described in the dependent claims. Embodiments of the present invention can be freely combined with each other if they are not mutually exclusive.

In one aspect, the invention relates to a method for extending kernel functionality of a kernel of a container-based virtualization system. The method comprises providing in the container-based virtualization system a compiling container for compiling kernel modules in the container-based virtualization system, and an application container for extending kernel functionality of the kernel using a kernel module; inputting by the application container the kernel module to the compiling container; compiling the kernel module using the compiling container; receiving by the application container from the compiling container the compiled kernel module; and loading by the application container the compiled kernel module to the kernel of the system for enabling the extension of the kernel functionality.

In another aspect, the invention relates to a computer program product comprising a computer-readable storage medium having computer-readable program code embodied therewith, the computer-readable program code being configured to extend kernel functionality of a kernel of a container-based virtualization system comprising a compiling container for compiling kernel modules in the container-based virtualization system, and an application container for extending kernel functionality of the kernel using a kernel module; the computer-readable program code being configured to: input the kernel module to the compiling container; receive from the compiling container the compiled kernel module; load the compiled kernel module to the kernel of the system for enabling the extension of the kernel functionality.

In another aspect, the invention relates to a computer system for extending kernel functionality of a kernel of a container-based virtualization system comprising a compiling container for compiling kernel modules in the container-based virtualization system, and an application container for extending kernel functionality of the kernel using a kernel module; the computer system being configured to: control the application container to input the kernel module to the compiling container; control the compiling container to compile the kernel module; control the application container to receive from the compiling container the compiled kernel module; and to load the compiled kernel module to the kernel of the container-based virtualization system.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

With the present method, the compilation of the kernel module may be performed on the fly during operation of the application container. The compilation responsibility may thus be moved to a containerization service and operating system of the container-based virtualization system. This may have the advantage that the application containers may become portable in that they may not depend on the system where they will be integrated because the kernel module would be compiled there and would be compatible with the system in which it is compiled. This is by contrast to application containers with precompiled modules, for which the system has to be checked first if it is consistent with the system where the kernel module has been pre-compiled. The present subject matter may thus prevent a lengthy process including pre-compilation of each kernel module in a separate system, putting the precompiled modules in the application containers and only then integrating/using the application containers e.g. either during the development cycle or later at the container deployment time. For example, when the pre-compilation of that process is done during the container image development it may significantly limit the environments where the resulting application container can be deployed and run. This is because the application container and its precompiled kernel module may need to be provided for each supported kernel separately.

The method may further comprise using the loaded kernel module by the application container. For example, the application container may use an additional kernel functionality (e.g. a driver) enabled by the kernel module and which may not have been available in the exiting kernel. The present subject matter may enable a stable build environment in order to achieve reproducible builds that do not depend on what system is used. For example, the compiling container may be created from a compiling image. The compiling image may be used for different system configurations. The compiling container and the application container may be provided so that they can communicate between each other.

The container-based virtualization system may be a container-based system. The container-based virtualization system may enable an operating-system-level virtualization. The OS-level virtualization may be enabled by the kernel of the container-based virtualization system which allows the existence of multiple isolated user-space instances. A container of the containers of the present subject matter may be an instance of such instances. A container manager may be installed in the container-based virtualization system in order to manage (e.g. create, delete, start etc.) the containers.

According to one embodiment, providing the compiling container comprises: building the compiling container at the container-based virtualization system from a compiling image, wherein the compiling container is a runnable instance of the compiling image. Building the compiling container at the system where it is used may enable a fully automated and efficient method. The method may be efficient as it may prevent a multiple-attempt download of compiling images which may not be suitable for the system.

An image may be an executable package that includes everything needed to run an application—the code, a runtime, libraries, environment variables, and configuration files. This may enable the compiling container to have access to artifacts such as a compiler, kernel source, additional compilation tools and scripts as well as test programs. The artifacts may be provided in the compiling image of the container-based virtualization system from which the compiling container has been created. The compiling container may be automatically created during the installation of the container manager of the container-based virtualization system. The compiling container may be reused by other application containers which needs to load own kernel modules.

According to one embodiment, providing the compiling container comprises receiving and integrating the compiling container into the container-based virtualization system. This may enable a flexible implementation of the present method. For example, multiple sources of images may be used by the present method for receiving the adequate compiling container. This may further have the advantage of saving the processing resources that would otherwise be required by a local creation of the compiling container. The received compiling container may, for example, have been created from the compiling image of the container-based virtualization system in a remote system.

According to one embodiment, the container-based virtualization system comprises a container manager, the method further comprising before the inputting step launching the compiling and application containers by the container manager, the launching enabling communication between the compiling and application containers. The container manager may for example be Docker or LXC. For example, the launching of the compiling and application containers may be performed by command line "docker run". The container manager may provide a centralized component for controlling the execution of the containers of the container-based virtualization system. For example, the method comprises, before launching the compiling container, determining if the compiling container is previously launched or not. If it is previously launched there may be no need to launch it again. This embodiment may be advantageous as the launching of the compiling container may be performed once for multiple application containers and thus may save processing resources that would otherwise be required by multiple launchings.

According to one embodiment, the container-based virtualization system comprises a container manager, the method further comprising before the inputting step launching the application container by the container manager, and launching the compiling container by the application container, the launching enabling communication between the compiling and application containers. This embodiment may be advantageous as this may increase the portability and independency of the application container.

In one example, the application container may be configured to create and to launch the compiling container. The compiling container may be created from a compiling image that is present in the container-based virtualization system.

According to one embodiment, the compiling image is created at the time of installation of the container manager or downloaded from a source database. For example, the container manager may comprise a service that is automatically executed when the container manager is installed. The service may be configured, once executed, to create the compiling image. In one example, the container manager may be installed at the time of installing the container based virtualization system.

Having the container image at the installation time may enable to create the compiling the container at very beginning e.g. first created container may be the compiling container. This may enable that each new additional application container can make use of the compiling container. This may increase the usage efficiency of the present method.

According to one embodiment, providing the application container comprises: receiving the application container and integrating the application container into the container-based virtualization system. The received application container may be configured to be used or executed in the container based virtualization system. In one example, the application container may be created in the container based virtualization system e.g. from an application image of the container based virtualization system.

According to one embodiment, the method further comprises deleting the compiling container. This may save processing resources (e.g. storage) in the container-based virtualization system. This may particularly be advantageous as the extension of kernel functionality may not be often needed.

According to one embodiment, the method further comprises rebuilding the compiling container from the compiling image for a further functionality extension of the kernel of the container-based virtualization system. This embodiment may make use of the existing compiling image and thus may save resources of creating the image each time the compiling container is to be created. For example, the further extension may be enabled by another kernel module of another application container or may be enabled by another kernel module of the application container of the container-based virtualization system.

In another example, the application container may be reused again (e.g. after rebooting the container-based virtualization system). For that, the compiling container may be rebuilt (if deleted) from the existing image and the inputting, compiling, receiving and loading steps may be repeated using the rebuilt compiling container. This may be advantageous in case the loaded kernel module have been unloaded.

In another example, the application container may use another kernel module. For that the compiling container may be rebuilt from the existing image and the inputting, compiling, receiving and loading steps may be repeated using the rebuilt compiling container in order to compile and load the other kernel module.

According to one embodiment, each of the compiling and application containers is a Docker container. This may enable a seamless integration of the present subject in existing systems.

According to one embodiment, the method further comprises storing the compiled kernel module in a storage accessible by the application container, in case the kernel module is unloaded from the kernel, reloading by the application container the stored compiled kernel module into the kernel. This may particularly be advantageous as the rebooting of the container-based virtualization system may cause the deletion/unloading of the loaded kernel module. For example, after reloading the application container may be launched again, and after being launched again it may determine that the kernel module has been unloaded and may then reload the stored compiled kernel module into the kernel.

According to one embodiment, the method further comprises providing a disk or storage in the container-based virtualization system that is accessible by the application and compiling container, wherein the inputting comprises: storing by the application container the kernel module in the disk and reading by the compiling container the kernel module from the disk. The disk may for example be mounted for both the application and the compiling container so that they can both access that disk. In one example, the receiving of the compiled kernel module may comprise storing by the compiling container the compiled kernel module in the disk and reading by the application container the compiled kernel module from the disk. The compiling and application container may be configured to automatically read the content of the disk e.g. as soon as new data is stored in the disk the containers may be configured to read the content of the disk.

Figure 1:
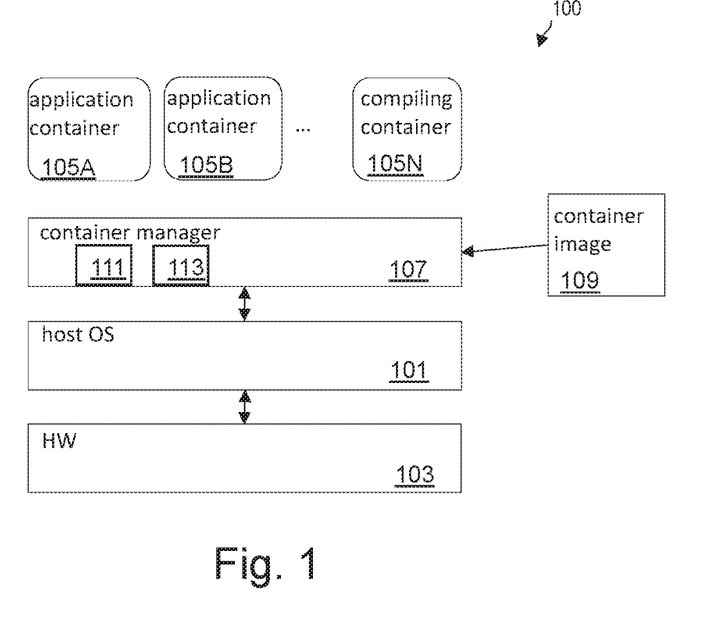
FIG. 1 is a block diagram of a container-based virtualization system.

FIG. 1 is a block diagram of a container-based virtualization system 100. The container-based virtualization system 100 comprises an operating system 101 and a hardware component 103. The hardware component 103 may for example include a processor, memory and devices such as input/output devices and/or peripherals.

For example, the container-based virtualization system 100 comprises a container manager (or containerization service) 107 executed at least in part by the operating system 101 for developing, delivering, installing and executing software containers. The container manager may for example be Docker or LXC. The container-based virtualization system 100 comprises software containers 105A-N. A software container of the software containers 105A-N may be created using the container manager 107. In another example, a software container of the software containers 105A-N may be received or imported and integrated in the container-based virtualization system 100 e.g. the received container may have been built in another system that has a same configuration (e.g. kernel configuration) as the container-based virtualization system 100.

The container manager 107 provides a set of capabilities which can be used by the application containers 105A-N. For example, the container manager 107 may comprise a storage enabling service 111. The storage enabling service 111 may, for example, enable persistent volumes and drivers. The container manager 107 may further comprise a network enabling service 113 for enabling communication between the application containers 105A-N. For example, the network enabling service 113 may enable virtual networks which can be used for intra-containers communication.

The operating system 101 in conjunction with the container manager 107 provides isolation between software processes executing in the system 100 such as application containers 105A-N. For example, the processes may be provisioned to have a private view of the operating system such that two processes cannot access each other's resources. Although isolated, the processes may still be capable of intercommunication such as by way of network connections or the like between the processes in the same way as unrelated and isolated computer systems can communicate via a network if configured and permitted to do so.

The container manager 107 may for example be configured to receive a container image 109 for instantiation, installation and/or execution in the operating system 101. The container image 109 may be created and/or modified by the container manager or another software component such as an installer. The container image 109 may be a software component for execution as an isolated process in the operating system 101. For example, the container image 109 may be a Docker image obtained from a container repository such as the Docker registry. For example, the container image 109 may be a read-only template with instructions for creating a container. Using the container image 109 a container may be instantiated by the container manger 107 for execution as one or more processes in the operating system 101.

The application containers 105A-N may be configured to communicate with each other. For example, a network of the container manager 107 (e.g. the network may be created by the network enabling service 113) may be used to communicate between the application containers. The network may for example be a bridge network of the Docker.

The software containers 105A-N comprise a compiling container (or compilation container) 105N in accordance with the present subject matter. The compiling container 105N may be configured to compile a kernel module such as a Linux kernel module. For example, the compiling container 105N may have access to artifacts which are needed to compile the kernel module. These are for example: kernel source files and headers, C compiler, compilation scripts. The compiling container may provide a build environment for compiling the kernel module in accordance with the configuration of the system 100.

The compiling container 105N may, for example, be created at the container manager installation time. The container manager 107 may have an optional OS packages dependency defined-kernel source files package, C compiler package. If these dependencies are not met the LKM compilation container image may not be created at the service installation time and it may not be available for the application containers.

The compiling container may be created at the time of installation of the container manager. This may be advantageous as the container manager may have a dependency on packages which needs to be installed in the system already before the installation. These packages may be used to create the compiling image. These packages may for example comprise a kernel source package, compiler, compilation tools, libraries and scripts.

The application container 105A may, for example, comprise a kernel module and may use the kernel module to extend the functionality of the kernel of the operating system 101.

Figure 2:
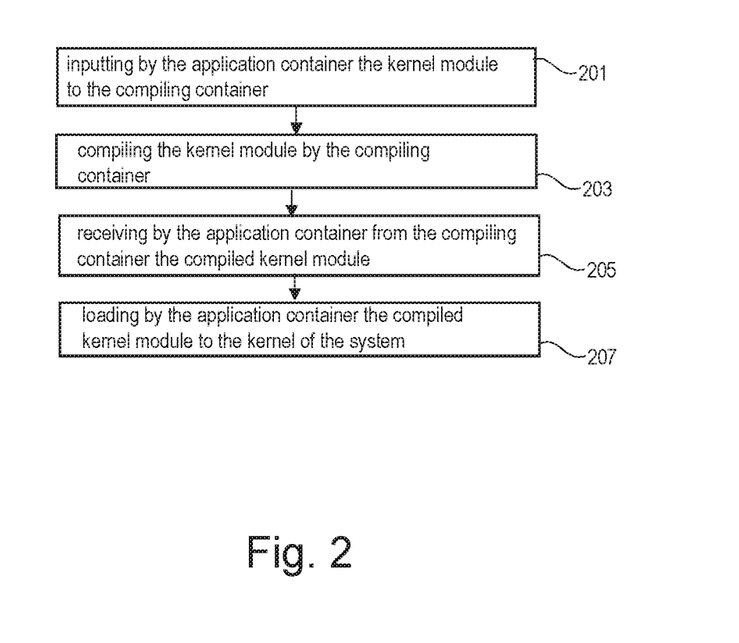
FIG. 2 is a flowchart of a method for extending kernel functionality of a kernel of a container-based virtualization system.

FIG. 2 is a flowchart of a method for extending kernel functionality of a kernel of a container-based virtualization system e.g. 100. For simplification purposes, the method of FIG. 2 is described with reference to FIG. 1's system but it is not limited to the example system of FIG. 1. The kernel functionality may, for example, be extended by a driver or a software module using an application container.

For example, the application container 105A may comprise a Linux kernel module. Once compiled, the Linux kernel module may be a piece of compiled binary code that can be inserted directly into a Linux kernel of the system 100. The loaded code may have access to everything in the system 100. This may enable the extension of the kernel functionality of the Linux kernel.

In one example, before performing step 201, the application container 105A and the compiling container 105N may be launched by the container manager. This may enable that the two containers can communicate data between each other. For example, the compiling container may be executed or launched before the application container 105A starts. The application container may be deployed and configured with LKMs sources. The compiling container may be used to compile, test and expose to the application container, the LKMs. In another example, the application container may first be launched by the container manager and the launched application container may launch the compiling container. After launching the two containers, the application container 105A may input in step 201 the kernel module into the compiling container 105N.

In one example, a disk may be mounted for both the application and the compiling container so that they can both access that disk. For example, for inputting the kernel module, the application container may store the kernel module into the disk and the compiling container may read the kernel module from the disk.

In another example, the compiling container may comprise a service. The service, once it runs in the compiling container, may enable communication between the application and compiling containers so that the application container may input the kernel module to the compiling container.

In response to receiving the kernel module as input, the compiling container 105N may compile in step 203 the kernel module against the operating system 101. And the resulting compiled kernel module may be sent by the compiling container 105N to the application container 105A.

The application container 105A may receive in step 205, from the compiling container 105N, the compiled kernel module. In one example, the application container may import the compiled kernel module from a storage e.g. the disk, where it is stored by the compiling container. In one example, the compiling container may transmit the compiled kernel module to the application container.

The application container 105A may load in step 207 the compiled kernel module to the kernel of the operating system 101. The application container 105A may use the loaded module in the runtime. This method may enable the application container to become independent of the host's kernel. Once loaded, the application container may use the kernel module to execute its function e.g. the application container may be a database server that can use the kernel module to store data using a new kernel functionality that is enabled by the kernel module.

Figure 3:
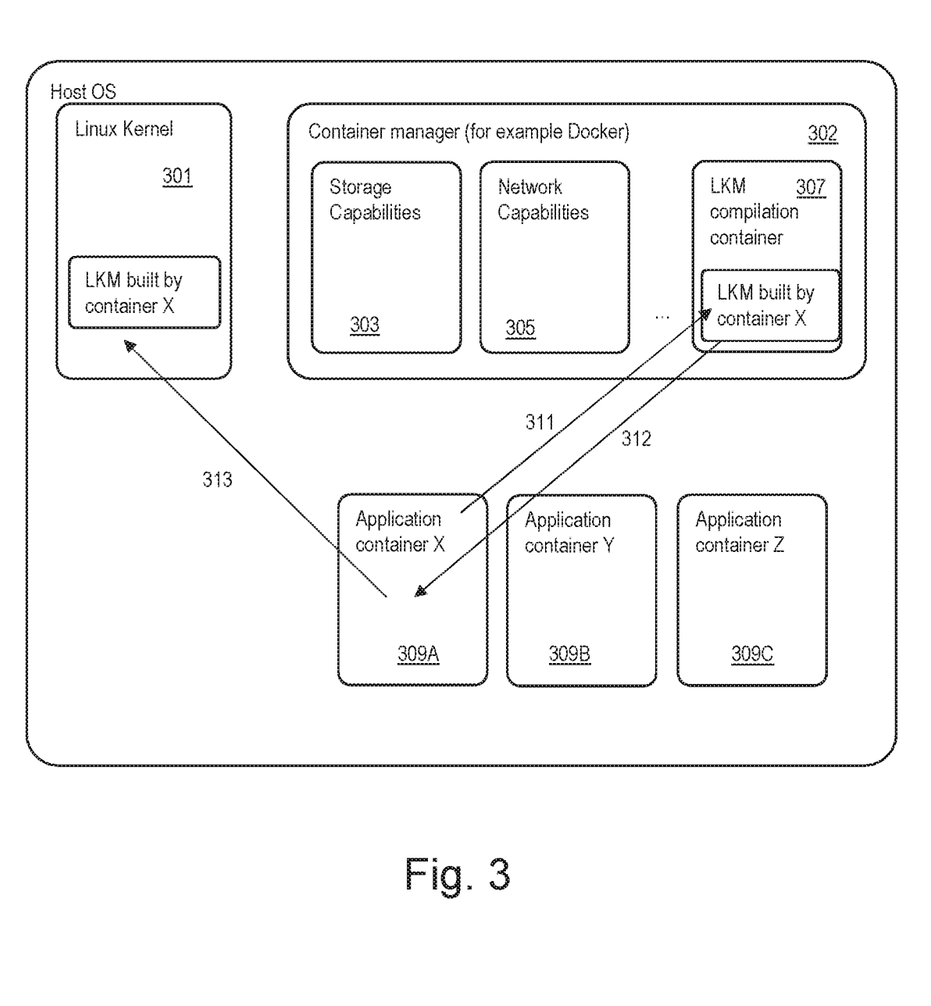
FIG. 3 is a block diagram of a container-based virtualization system illustrating an example for extending the function of a Linux kernel.

FIG. 3 is a block diagram of a container-based virtualization system 300 illustrating an example for extending the function of a Linux kernel 301. The container-based virtualization system 300 comprises a container manager (or containerization service) 302.

The container manager 302 comprises a storage enabling service 303. The storage enabling service 303 may, for example, enable persistent volumes and drivers. The container manager 302 further comprises a network enabling service 305 for enabling communication between application containers 309A-C and 307 of the container-based virtualization system 300. For example, the network enabling service 305 may enable virtual networks which can be used for intra-containers communication.

The application containers comprise a Linux kernel module (LKM) compilation container 307. For example, an application development team has tested LKM compilation in the LKM compilation container before being used in the present method of FIG. 3 e.g. the LKM container may have been available and tested in a given containerization service which may or may not be the container manager 302. LKM compilation container 307 may for example be deployed in the container-based virtualization system 300 from an available image.

The application container 309A has a need to load and use a LKM. The application container 309A may ship LKM source files. The application container 309A may take advantage of the LKM compilation container 307 during the deployment. For example, the application container 309A sends the LKM source files and compiles the LKM against the currently running Linux kernel (311). Compiled LKM binary is copied from LKM compilation container 307 back to application container 309A (312). After that, the LKM compilation container 307 is deleted from the container-based virtualization system 300 as it may no longer be needed at this point. If another application container will also need to compile an LKM another instance of the LKM compilation container can be deployed from the available image. The application container 309A loads (313) the compiled LKM into the Linux kernel 301. After that, the application container 309A may be fully deployed and started.

Figure 4:
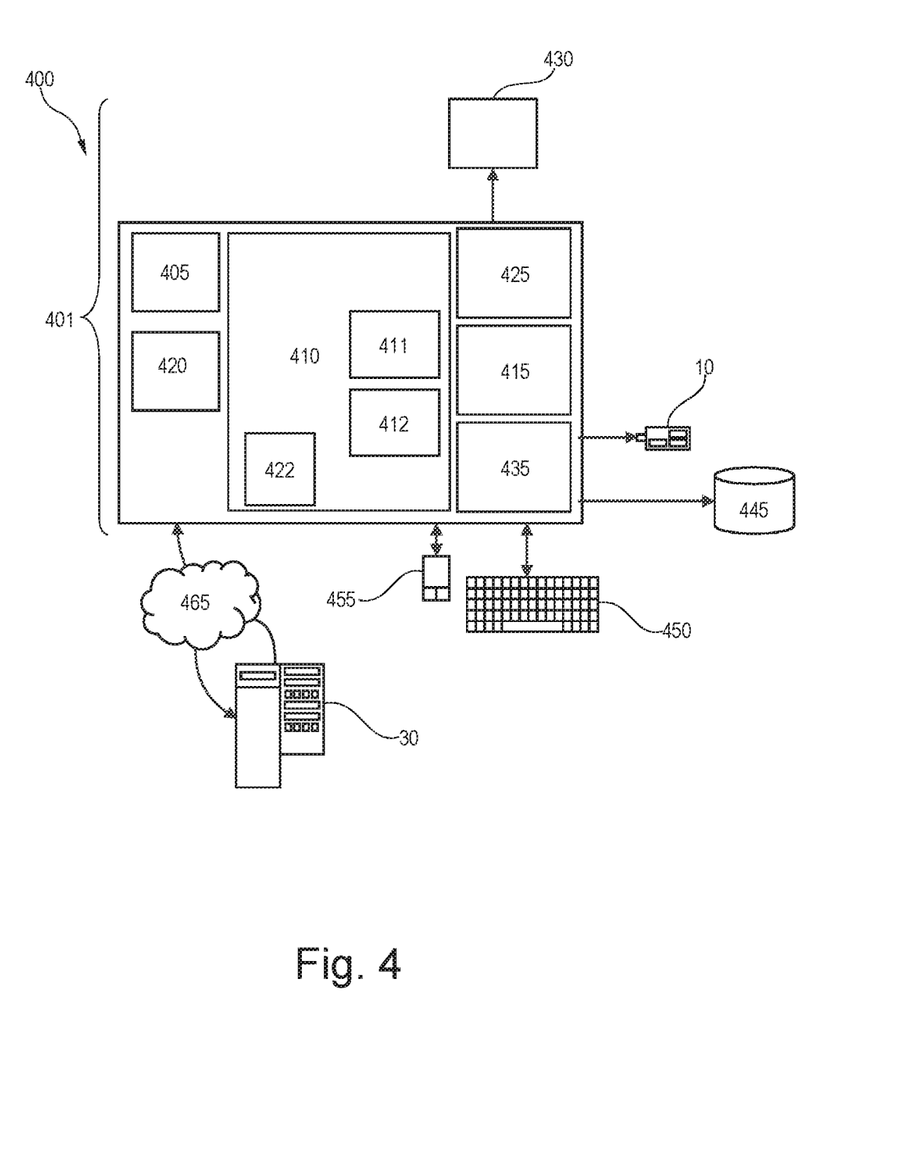
FIG. 4 represents a computerized system, suited for implementing one or more method steps as involved in the present disclosure.

FIG. 4 represents a general computerized system 400 such as container-based virtualization system 100 suited for implementing method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 412, 422 (including firmware 422), hardware (processor) 405, or a combination thereof. In exemplary embodiments, the methods described herein are implemented in software, as an executable program, and is executed by a special or general-purpose digital computer, such as a personal computer, workstation, minicomputer, or mainframe computer. The most general system 400 therefore includes a general-purpose computer 401.

In exemplary embodiments, in terms of hardware architecture, as shown in FIG. 4, the computer 401 includes a processor 405, memory (main memory) 410 coupled to a memory controller 415, and one or more input and/or output (I/O) devices (or peripherals) 10, 445 that are communicatively coupled via a local input/output controller 435. The input/output controller 435 can be, but is not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 445 may generally include any generalized cryptographic card or smart card known in the art.

The processor 405 is a hardware device for executing software, particularly that stored in memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing software instructions.

The memory 410 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 410 can have a distributed architecture, where various components are situated remote from one another, but can be accessed by the processor 405.

The software in memory 410 may include one or more separate programs, each of which comprises an ordered listing of executable instructions for implementing logical functions, notably functions involved in embodiments of this invention. In the example of FIG. 4, software in the memory 410 includes instructions 412 e.g. instructions to manage databases such as a database management system.

The software in memory 410 shall also typically include a suitable operating system (OS) 411. The OS 411 essentially controls the execution of other computer programs, such as possibly software 412 for implementing methods as described herein.

The methods described herein may be in the form of a source program 412, executable program 412 (object code), script, or any other entity comprising a set of instructions 412 to be performed. When a source program, then the program needs to be translated via a compiler, assembler, interpreter, or the like, which may or may not be included within the memory 410, so as to operate properly in connection with the OS 411. Furthermore, the methods can be written as an object-oriented programming language, which has classes of data and methods, or a procedure programming language, which has routines, subroutines, and/or functions.

In exemplary embodiments, a conventional keyboard 450 and mouse 455 can be coupled to the input/output controller 435. Other output devices such as the I/O devices 445 may include input devices, for example but not limited to a printer, a scanner, microphone, and the like. Finally, the I/O devices 10, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 445 can be any generalized cryptographic card or smart card known in the art. The system 400 can further include a display controller 425 coupled to a display 430. In exemplary embodiments, the system 400 can further include a network interface for coupling to a network 465. The network 465 can be an IP-based network for communication between the computer 401 and any external server, client and the like via a broadband connection. The network 465 transmits and receives data between the computer 401 and external systems 30, which can be involved to perform part or all of the steps of the methods discussed herein. In exemplary embodiments, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the software in the memory 410 may further include a basic input output system (BIOS) 422. The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute software 412 stored within the memory 410, to communicate data to and from the memory 410, and to generally control operations of the computer 401 pursuant to the software. The methods described herein and the OS 411, in whole or in part, but typically the latter, are read by the processor 405, possibly buffered within the processor 405, and then executed.

When the systems and methods described herein are implemented in software 412, as is shown in FIG. 4, the methods can be stored on any computer readable medium, such as storage 420, for use by or in connection with any computer related system or method. The storage 420 may comprise a disk storage such as HDD storage.

Figure 5:
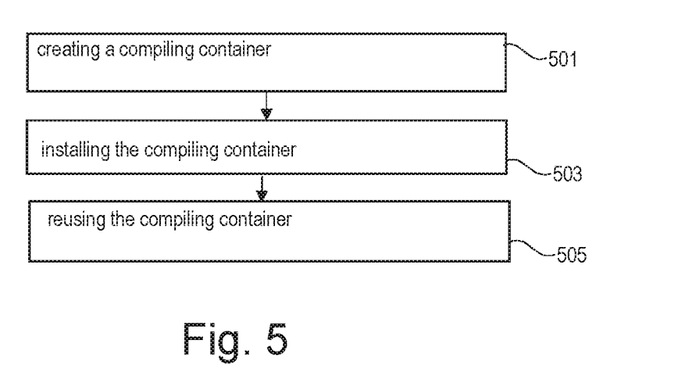
FIG. 5 is a flowchart of a method for creating a reusable standardized compiling container to apply at least one new application against an existing kernel source code.

FIG. 5 is a flowchart of a method for creating a reusable standardized compiling container to apply at least one new application against an existing kernel source code. In step 501, a compiling container having access to different components of a pre-installed host system like a compiler, a kernel source code, at least one special compilation tool, at least one library, at least one script, at least one test program may be created. The compiling container may be installed in step 503 on the host system for further usage. The compiling container may be reused in step 505 for additional application containers containing LKM (Linux kernel modules).

Figure 6:
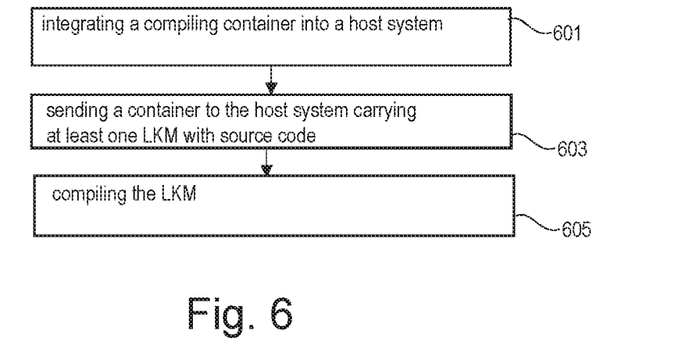
FIG. 6 is a flowchart of a method for applying a new application container which includes Linux kernel modules (LKM) into existing kernel source code.

FIG. 6 is a flowchart of a method for applying a new application container which includes Linux kernel modules (LKM) into existing kernel source code. In step 601, a compiling container may be integrated into a host system. The new application may send in step 603 a container to the host system carrying at least one LKM with source code. The LKM of the new application container may be compiled in step 605. The compilation is done with the compiling container having the ability to compile the LKM directly against the running host kernel.

Various example embodiments are specified in the following clauses:

Example 1 includes a method for extending kernel functionality of a kernel of a container-based virtualization system. The method comprises providing in the container-based virtualization system a compiling container for compiling kernel modules in the container-based virtualization system, and an application container for extending kernel functionality of the kernel using a kernel module. The method further comprises inputting by the application container the kernel module to the compiling container; compiling the kernel module using the compiling container; receiving by the application container from the compiling container the compiled kernel module; and loading by the application container the compiled kernel module to the kernel of the system for enabling the extension of the kernel functionality.

Example 2 includes the method of example 1, wherein providing the compiling container comprises building the compiling container at the container-based virtualization system from a compiling image, wherein the compiling container is a runnable instance of the compiling image.

Example 3 includes the method of example 1, wherein providing the compiling container comprises receiving and integrating the compiling container into the container-based virtualization system.

Example 4 includes the method of any of examples 1-3, wherein the container-based virtualization system comprises a container manager and wherein the method further comprises, before the inputting step, launching the compiling and application containers by the container manager, the launching enabling communication between the compiling and application containers.

Example 5 includes the method of any of examples 1-3, wherein the container-based virtualization system comprises a container manager and wherein the method further comprises, before the inputting step, launching the application container by the container manager, and launching the compiling container by the application container, the launching enabling communication between the compiling and application containers.

Example 6 includes the method of any of examples 2-5, wherein the compiling image is created at the time of installation of the container-based virtualization system or downloaded from a source database.

Example 7 includes the method of any of examples 1-6, wherein providing the application container comprises: receiving the application container and integrating the application container into the container-based virtualization system.

Example 8 includes the method of any of examples 1-7, further comprising deleting the compiling container.

Example 9 includes the method of example 8, further comprising rebuilding the compiling container from the compiling image for a further extension of the kernel of the container-based virtualization system.

Example 10 includes the method of any of examples 1-9, further comprising storing the compiled kernel module in a storage accessible by the application container, in case the kernel module is unloaded from the kernel, reloading by the application container the stored compiled kernel module into the kernel.

Example 11 includes the method of any of examples 1-10, further comprising providing a disk in the container-based virtualization system that is accessible by the application and compiling container, wherein the inputting comprises: storing by the application container the kernel module in the disk and reading by the compiling container the kernel module from the disk.

Example 12 includes the method of any of examples 1-11, wherein each of the compiling and application containers is a Docker container.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for extending kernel functionality of a kernel of a container-based virtualization system, the method comprising:
providing in the container-based virtualization system a compiling container for compiling kernel modules in the container-based virtualization system, and an application container for extending kernel functionality of the kernel using a kernel module;
inputting by the application container the kernel module to the compiling container;
compiling the kernel module using the compiling container;
receiving by the application container from the compiling container the compiled kernel module;
loading by the application container the compiled kernel module to the kernel of the system for enabling the extension of the kernel functionality.

2. The method of claim 1, wherein providing the compiling container comprises: building the compiling container at the container-based virtualization system from a compiling image, wherein the compiling container is a runnable instance of the compiling image.

3. The method of claim 2, wherein the compiling image is created at the time of installation of the container-based virtualization system or downloaded from a source database.

4. The method of claim 1, wherein the container-based virtualization system comprises a container manager, the method further comprising: before the inputting step, launching the compiling and application containers by the container manager, the launching enabling communication between the compiling and application containers.

5. The method of claim 1, wherein the container-based virtualization system comprises a container manager, the method further comprising: before the inputting step, launching the application container by the container manager, and launching the compiling container by the application container, the launching enabling communication between the compiling and application containers.

6. The method of claim 1, wherein providing the compiling container comprises receiving and integrating the compiling container into the container-based virtualization system.

7. The method of claim 1, wherein providing the application container comprises: receiving the application container and integrating the application container into the container-based virtualization system.

8. The method of claim 1, further comprising deleting the compiling container.

9. The method of claim 8, further comprising rebuilding the compiling container from the compiling image for a further functionality extension of the kernel of the container-based virtualization system.

10. The method of claim 1, further comprising storing the compiled kernel module in a storage accessible by the application container, in case the kernel module is unloaded from the kernel, reloading by the application container the stored compiled kernel module into the kernel.

11. The method of claim 1, further comprising providing a disk in the container-based virtualization system that is accessible by the application and compiling container, wherein the inputting comprises: storing by the application container the kernel module in the disk and reading by the compiling container the kernel module from the disk.

12. The method of claim 1, wherein each of the compiling and application containers is a Docker container.

13. A computer program product comprising a computer-readable storage medium having computer-readable program code embodied therewith, the computer-readable program code being configured to extend kernel functionality of a kernel of a container-based virtualization system comprising a compiling container for compiling kernel modules against the kernel of the container-based virtualization system, and an application container for extending kernel functionality of the kernel using a kernel module; wherein the computer-readable program code, when executed by a processor, causes the application container to:

input the kernel module to the compiling container;
receive from the compiling container the compiled kernel module; and
load the compiled kernel module to the kernel of the system for enabling the extension of the kernel functionality.

14. The computer program product of claim 13, wherein the computer-readable program code is further configured to cause the processor to build the compiling container from a compiling image, wherein the compiling container is a runnable instance of the compiling image.

15. The computer program product of claim 14, wherein the compiling image is created at the time of installation of the container-based virtualization system or downloaded from a source database.

16. The computer program product of claim 14, further being configured to rebuild the compiling container from the compiling image for a further functionality extension of the kernel of the container-based virtualization system.

17. The computer program product of claim 13, wherein the computer-readable program code is further configured to cause the processor to delete the compiling container.

18. The computer program product of claim 13, wherein the computer-readable program code is further configured to cause the processor to receive and integrate the compiling container into the container-based virtualization system.

19. The computer program product of claim 13, wherein each of the compiling and application containers is a Docker container.

20. A computer system for extending kernel functionality of a kernel of a container-based virtualization system, the computer system comprising:

a memory configured to store program code; and
a processor coupled to the memory and configured to execute the program code to implement a compiling container for compiling kernel modules against the kernel of the container-based virtualization system, and an application container for extending kernel functionality of the kernel using a kernel module;
wherein the processor is further configured to:
control the application container to input the kernel module to the compiling container;
control the compiling container to compile the kernel module; and
control the application container to receive, from the compiling container, the compiled kernel module and to load the compiled kernel module to the kernel of the container-based virtualization system.

* * * * *